United States Patent
Jin et al.

(10) Patent No.: US 9,939,523 B2
(45) Date of Patent: Apr. 10, 2018

(54) VEHICLE TYPE RADAR SYSTEM, AND METHOD FOR REMOVING AN UNINTERESTED TARGET

(71) Applicant: MANDO CORPORATION, Pyeongtaek-si, Gyeonggi-do (KR)

(72) Inventors: Ho Young Jin, Seoul (KR); Gi-Hyun Seo, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 7 days.

(21) Appl. No.: 14/814,515

(22) Filed: Jul. 31, 2015

(65) Prior Publication Data
US 2017/0031017 A1    Feb. 2, 2017

(51) Int. Cl.
| | |
|---|---|
| G01S 13/06 | (2006.01) |
| G01S 13/58 | (2006.01) |
| G01S 13/86 | (2006.01) |
| B60Q 9/00 | (2006.01) |
| B60W 30/14 | (2006.01) |
| G01S 13/93 | (2006.01) |
| G01S 13/72 | (2006.01) |
| G01S 13/87 | (2006.01) |

(52) U.S. Cl.
CPC ............ G01S 13/867 (2013.01); B60Q 9/008 (2013.01); B60W 30/143 (2013.01); G01S 13/726 (2013.01); G01S 13/931 (2013.01); *G01S 13/87* (2013.01); *G01S 2013/9321* (2013.01); *G01S 2013/9357* (2013.01)

(58) Field of Classification Search
CPC .......... G01S 13/04; G01S 13/06; G01S 13/50; G01S 13/52; G01S 13/538; G01S 13/56; G01S 13/58; G01S 2013/93; G01S 2013/931; G01S 2013/9321

USPC ........................................................ 701/93
See application file for complete search history.

(56) References Cited

U.S. PATENT DOCUMENTS

| | | | | |
|---|---|---|---|---|
| 2008/0042894 | A1* | 2/2008 | Kikuchi ............. | B60W 10/184 342/71 |
| 2010/0253493 | A1* | 10/2010 | Szczerba ............. | G01S 13/723 340/435 |
| 2013/0307718 | A1* | 11/2013 | Aoki ...................... | G01S 13/50 342/61 |

FOREIGN PATENT DOCUMENTS

DE    102010013401 A1    10/2010

OTHER PUBLICATIONS

German Office Action dated May 9, 2016 in connection with the counterpart German Patent Application No. 102015009849.7.

* cited by examiner

*Primary Examiner* — Kimberly S Berona
*Assistant Examiner* — Anshul Sood
(74) *Attorney, Agent, or Firm* — Hauptman Ham, LLP

(57) ABSTRACT

According to an exemplary embodiment of the present invention, a vehicle type radar system includes: a camera unit configured to photograph a front of a vehicle to detect a lane; a radar unit configured to detect an object based on a reflected radar signal which is transmitted to the front of the vehicle and then returns and calculate a position, a speed, and a distance of the detected object; a sensor unit configured to detect weather conditions around the vehicle; a control unit configured to recognize a lane using the camera unit and recognize whether the detected object is a vehicle or a non-vehicle to perform a control to remove the object if it is determined that the detected object is the non-vehicle and display the recognized lane and vehicle; and a display unit configured to display the recognized lane and object.

9 Claims, 8 Drawing Sheets

VEHICLE TYPE RADAR SYSTEM, AND METHOD FOR REMOVING AN UNINTERESTED TARGET

BACKGROUND OF THE INVENTION

Field of the Invention

Exemplary embodiments of the present invention relate to signal processing using a vehicle type radar, and more particularly to, a vehicle type radar system and a method for removing an uninterested target capable of detecting and removing uninterested targets, such as snow, hailstone, and rain, by a radar while a vehicle having a smart cruise control (SCC) system is driving.

Description of the Related Art

Generally, an SCC system means an automatic driving system which detects other vehicles by radar while a vehicle is driving to automatically reduce a speed of driving vehicles when the surrounding vehicles approach its own vehicle, thereby preventing a bump accident from happening.

The SCC system is an apparatus of constantly keeping a driving speed of a vehicle and has been mainly used for a long-distance movement on an expressway rather than on a general road or a national road which goes through many signal controls.

The SCC system selects, as a target, vehicles closest to a driving direction of a vehicle to be controlled among target vehicles in front of a vehicle to be controlled which are detected by a radar, and therefore discontinuity of target information essentially occurs at the moment that a driving condition in front of the vehicle to be controlled is changed. That is, when adjacent vehicles driving on other lanes from a vehicle to be controlled and a target vehicle in front of a vehicle to be controlled appear in a driving direction due to cutting in therebetween, deceleration and acceleration is reduced as much as twice in response to a sudden change in inter-vehicle distance than before and thus an abrupt collision accident is prevented from happening.

However, when a vehicle having the SCC system is driving in bad weather conditions such as snow, hailstone, and heavy rain, the vehicle is driving in a state in which the target vehicles closest to a driving direction of the vehicle to be controlled among several target vehicles detected by the radar are selected as the target. However, the vehicle suddenly stops (or jerks) based on a reflected radar signal when a ghost happens due to snow, hailstone, or rain in front of the vehicle to be controlled, such that a traffic accident may happen.

SUMMARY OF THE INVENTION

An object of the present invention relates to a vehicle type radar system and a method for removing an uninterested target capable of detecting and removing uninterested targets, such as snow, hailstone, and rain, by a radar while vehicles having a smart cruise control (SCC) system are driving.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a vehicle type radar system, including: a camera unit configured to photograph a front of a vehicle to detect a lane; a radar unit configured to transmit a radar signal to the front of the vehicle, detect an object based on a reflected radar signal and calculate a position, a speed, and a distance of the detected object; a sensor unit configured to detect weather conditions around the vehicle; a control unit configured to recognize a lane using the camera unit and recognize whether the detected object is a vehicle or a non-vehicle to perform a control to remove the object if it is determined that the detected object is the non-vehicle and display the recognized lane and vehicle; and a display unit configured to display the recognized lane and object.

The control unit may include: a weather condition recognition unit configured to recognize the weather conditions around the vehicle about whether rain falls or snow falls using the sensor unit; a lane recognition unit configured to recognize a driving lane or adjacent lanes based on image data photographed by the camera unit; a radar processing unit configured to process a pre-processing process and a post-processing process on the reflected radar signal to generate the object; a tracking processing unit configured to generate a track based on the generated object and perform a track managing process to select a control target; a vehicle control unit configured to control a vehicle speed and a vehicle state depending on the selected control target; and an alarm unit configured to alarm when the vehicle approaches the control target within a predetermined distance.

When the weather conditions around the vehicle are a weather condition to which a specific function is applied, a forward vehicle is present on a self lane of the vehicle and thus a distance from the forward vehicle is smaller than a critical distance, and a new object is detected between the forward vehicle and a self vehicle, the control unit may determine whether the new object is an object which is being tracked beforehand and if it is determined that the new object is not the object which is not being tracked beforehand, recognize the object as the non-vehicle to remove and exclude the object from objects to be tracked.

When the weather conditions around the vehicle are a weather condition to which a specific function is applied, a forward vehicle is present on a self lane of the vehicle and thus a distance from the forward vehicle is smaller than a critical distance, and a new object is detected between the forward vehicle and a self vehicle, the control unit may determine whether the new object is an object which is being tracked beforehand and if it is determined that the new object is the object which is being tracked beforehand, recognize the object as the vehicle to control and alarm a vehicle speed.

When the weather conditions around the vehicle are a weather condition to which a specific function is applied and a new object is detected in a state in which a forward vehicle is not present on a self lane of the vehicle, the control unit may determine whether the new object is an object which is being tracked beforehand and if it is determined that the new object is not the object which is not being tracked beforehand, recognize the object as the non-vehicle to remove and exclude the object from objects to be tracked.

When the weather conditions around the vehicle are a weather condition to which a specific function is applied and a new object is detected in a state in which a forward vehicle is not present on a self lane of the vehicle, the control unit may determine whether the new object is an object which is being tracked beforehand and if it is determined that the new object is the object which is being tracked beforehand, recognize the object as the vehicle to perform a control to control and alarm the vehicle speed.

In accordance with another aspect of the present invention, a method for removing an uninterested target, including: detecting weather conditions around the vehicle; photographing a front of the vehicle to detect a lane; detecting an object based on a reflected radar signal from a radar signal being transmitted to a front of the vehicle; and determining whether the detected object is a vehicle or a non-vehicle to recognizing and removing an object, which is the non-vehicle, as an uninterested target.

The method may further include: displaying an object which is the vehicle remaining after the object which is the non-vehicle is removed and the recognized lane.

In the detecting of the object, the reflected radar signal may be processed by a pre-processing process and a post-processing process to generate the object and a track is generated based on the generated object and goes through a track managing process to select a control target.

In the removing, when the weather conditions around the vehicle are a weather condition to which a specific function is applied, a forward vehicle is present on a self lane of the vehicle and thus a distance from the forward vehicle is smaller than a critical distance, and a new object is detected between the forward vehicle and a self vehicle, it may be determined whether the new object is an object which is being tracked beforehand and if it is determined that the new object is not the object which is not being tracked beforehand, the object may be recognized as the non-vehicle to be removed and excluded from objects to be tracked.

In the removing, when the weather conditions around the vehicle are a weather condition to which a specific function is applied, a forward vehicle is present on a self lane of the vehicle and thus a distance from the forward vehicle is smaller than a critical distance, and a new object is detected between the forward vehicle and a self vehicle, it may be determined whether the new object is an object which is being tracked beforehand and if it is determined that the new object is the object which is being tracked beforehand, the object may be recognized as the vehicle to control and alarm a vehicle speed.

In the removing, when the weather conditions around the vehicle are a weather condition to which a specific function is applied and a new object is detected in a state in which a forward vehicle is not present on a self lane of the vehicle, it may be determined whether the new object is an object which is being tracked beforehand and if it is determined that the new object is not the object which is not being tracked beforehand, the object may be recognized as the non-vehicle to remove and exclude the object from objects to be tracked.

In the removing, when the weather conditions around the vehicle are a weather condition to which a specific function is applied and a new object is detected in a state in which a forward vehicle is not present on a self lane of the vehicle, it may be determined whether the new object is an object which is being tracked beforehand and if it is determined that the new object is the object which is being tracked beforehand, the object may be recognized as the vehicle to control and alarm a vehicle speed.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
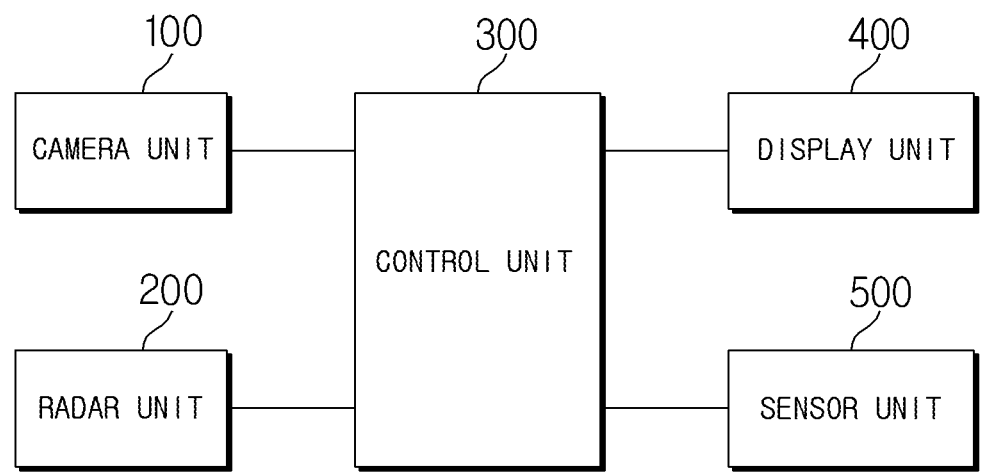
FIG. 1 is a configuration diagram schematically illustrating a configuration of a vehicle type radar system according to an exemplary embodiment of the present invention.

Hereinafter, exemplary embodiments of the present invention will be described in detail with reference to the accompanying drawings so that those skilled in the art may easily practice the present invention. However, the present invention may be implemented in various different forms and is not limited to the exemplary embodiments provided in the present description.

A part irrelevant to the description will be omitted to clearly describe the present invention, and the same or like elements will be designated by the same reference numerals throughout the specification.

All terms including technical terms and scientific terms used herein have the same meaning as the meaning generally understood by those skilled in the art to which the present invention pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present invention so as to be easily practiced by a person skilled in the art to which the present invention pertains will be described in detail with reference to the accompanying drawings. However, the present invention may be modified in various different ways and is not limited to the embodiments provided in the present description.

FIG. 1 is a configuration diagram schematically illustrating a configuration of a vehicle type radar system according to an exemplary embodiment of the present invention.

Referring to FIG. 1, the vehicle type radar system according to the exemplary embodiment of the present invention includes a camera unit 100 configured to photograph a front of a vehicle to detect a lane; a radar unit 200 configured to detect a position, a speed, and a distance of an object in front of the vehicle based on a reflected radar signal which is transmitted to the front of the vehicle and then reflected and returning from the object; a control unit 300 configured to recognize a lane using the camera unit 100 and recognize whether the detected object is a vehicle or a non-vehicle to perform a control to remove the object if it is determined that the object is the non-vehicle and display the recognized lane and vehicle; a display unit 400 configured to display the detected lane or the position, speed, and distance of the detected object; and a sensor unit 500 configured to detect weather conditions around the vehicle.

Here, the sensor unit 500 detects rainwater when rain falls around a vehicle or detects a temperature of snow or snowmelt when snow falls, thereby recognizing a condition in which rain falls or snow falls.

Further, the sensor unit 500 may access a weather center or a weather related apparatus through a wireless network to get weather information around a vehicle and transmit the climate information to the control unit 300.

Figure 2:
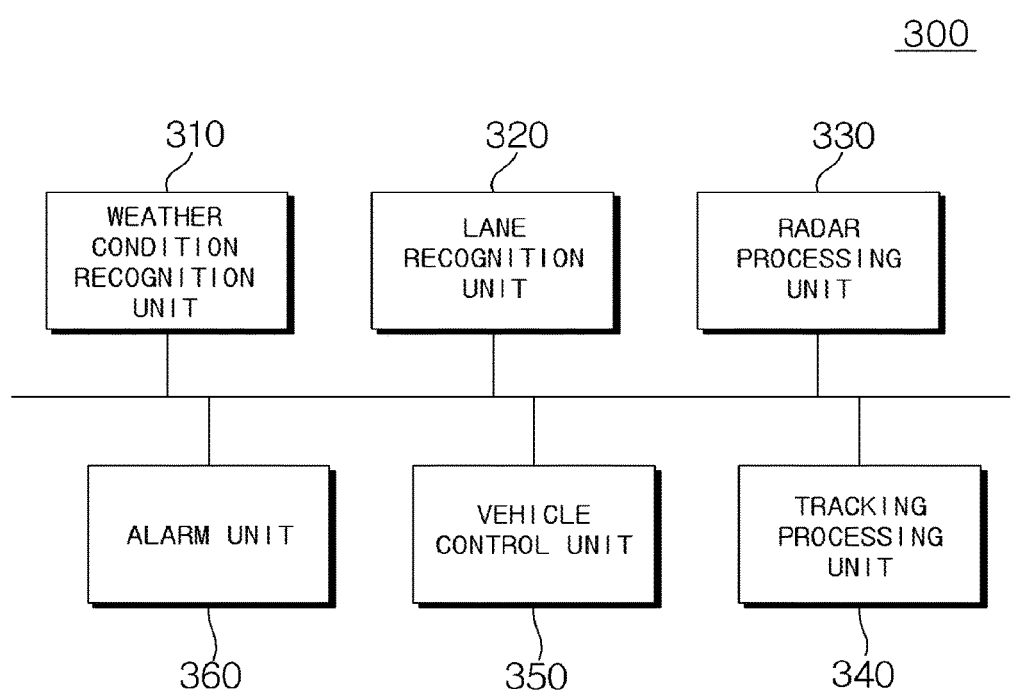
FIG. 2 is a configuration diagram illustrating a configuration example of a control unit in the vehicle type radar system of FIG. 1 according to the exemplary embodiment of the present invention.

FIG. 2 is a configuration diagram illustrating a configuration example of a control unit in the vehicle type radar system according to the exemplary embodiment of the present invention.

Referring to FIG. 2, the control unit 300 in the vehicle type radar system according to the exemplary embodiment of the present invention includes a weather condition recognition unit 310, a lane recognition unit 320, a radar processing unit 330, a tracking processing unit 340, a vehicle control unit 350, and an alarm unit 360.

The weather condition recognition unit 310 recognizes climate conditions, such as whether rain falls, snow falls, or the like, using the sensor unit 500.

The lane recognition unit 320 recognizes a driving lane or adjacent lanes based on image data photographed by the camera unit 100.

The radar processing unit 330 processes a reflected radar signal received through a radar unit 200 by a pre-processing process and a -{ }-post-processing process to generate an object and calculate a position and a speed of the object, a distance from the object, etc., based on the reflected radar signal. To this end, the radar processing unit 330 generates an object by performing the pre-processing process and the post-processing process on the reflected radar signal received. The pre-processing process converts a time domain for the reflected radar signal into a frequency domain and the post-processing process selects a target candidate group in the frequency domain. Here, the pre-processing process and the post-processing process for the radar signal are a technology which is generally known in the same technical field, and therefore a detailed description thereof will be omitted.

The tracking processing unit 340 generates a track based on the generated object and performs a track managing process to select a control target.

The vehicle control unit 350 controls a vehicle state in addition to a vehicle speed depending on the selected control target.

The alarm unit 360 alarms a driver that a self vehicle approaches the control target within a predetermined distance to be in danger situations.

Figure 3:
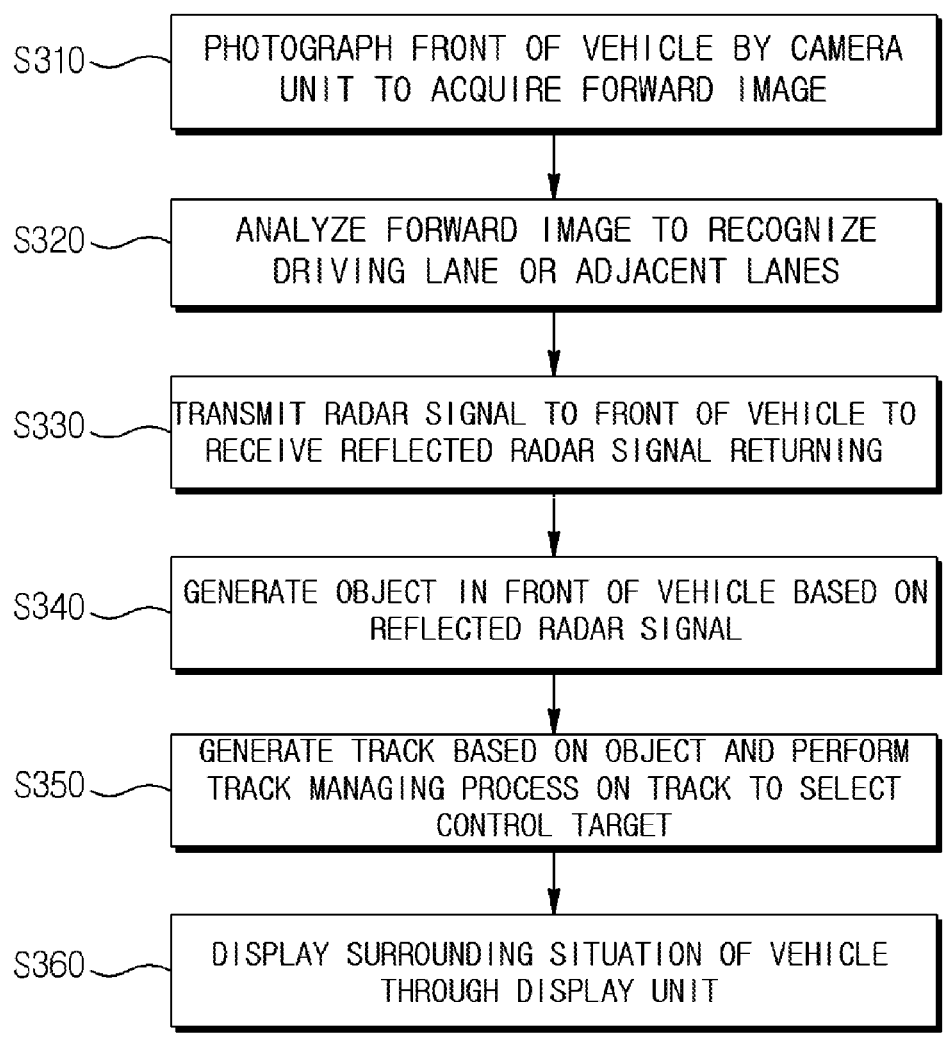
FIG. 3 is a flow chart illustrating a control operation process of the vehicle type radar system according to the exemplary embodiment of the present invention.

FIG. 3 is a flow chart illustrating a control operation process of the vehicle type radar system according to the exemplary embodiment of the present invention.

Referring to FIG. 3, the vehicle type radar system according to the exemplary embodiment of the present invention first photographs the front of the vehicle by the camera unit 100 to acquire a forward image (S310).

Next, the lane recognition unit 320 analyzes the forward image to recognize a driving lane or adjacent lanes (S320).

Next, the radar unit 200 transmits the radar signal to the front of the vehicle and receives the reflected radar signal reflected and returning from an object in front of the vehicle (S330).

Figure 4:
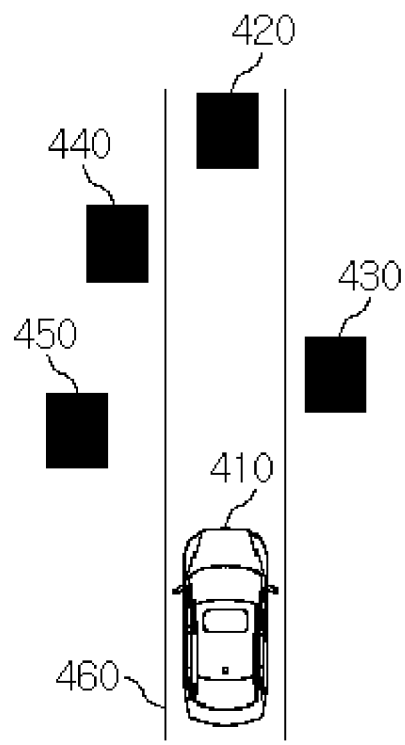
FIG. 4 is a diagram illustrating an example in which a general control result of the vehicle type radar system according to the exemplary embodiment of the present invention is displayed.

Next, the radar processing unit 330 generates an object in front of the vehicle as illustrated in FIG. 4 based on the reflected radar signal received (S340).

Next, the tracking processing unit 340 generates the track based on the generated object and performs the track managing process to select the control target (S350).

In this case, the tracking processing unit 340 keeps on storing the track information obtained in the track managing process in a storage unit (not illustrated) for a predetermined time.

Next, the vehicle control unit 350 displays the surrounding situations of the vehicle through the display unit 400 as illustrated in FIG. 3 (S360). FIG. 4 is a diagram illustrating an example in which a general control result of the vehicle type radar system according to the exemplary embodiment of the present invention is displayed.

That is, as illustrated in FIG. 4, the vehicle control unit 350 displays a lane 460 on which a self vehicle 410 is driving, a control target 420 which is positioned in front of the self vehicle 410, objects 430 to 450 which are positioned at adjacent lanes, etc., on a screen through the display unit 400, so that a driver may recognize the surrounding situations of the vehicle. Here, the control target 420 may mean the forward vehicle which is in a lane on which the self vehicle 410 is driving and the objects 430 to 450 which are positioned on adjacent lanes may mean other vehicles which are driving on adjacent lanes.

Figure 5:
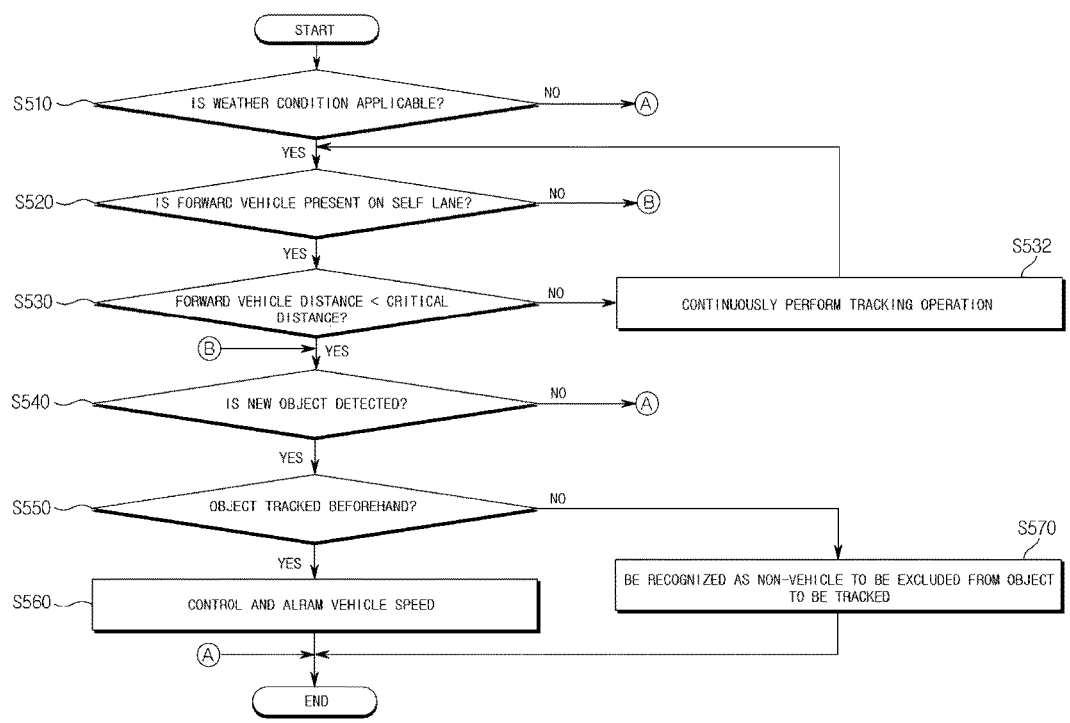
FIG. 5 is an operation flow chart for describing a method for removing an uninterested target of the vehicle type radar system according to the exemplary embodiment of the present invention.

FIG. 5 is an operation flow chart for describing a method for removing an uninterested target of the vehicle type radar system according to the exemplary embodiment of the present invention.

The present invention may recognize a non-vehicle like a ghost as an uninterested target by determining whether the object detected by the radar is a vehicle or a non-vehicle while a vehicle is driving on a snowy day or a rainy day and remove the recognized non-vehicle.

Referring to FIG. 5, the vehicle type radar system according to the exemplary embodiment of the present invention determines whether the forward vehicle is present on the self lane by the radar unit 330 (S520) if it is determined by the weather condition recognition unit 310 that the weather condition detected by the sensor unit 500 is weather conditions such as a snowy condition and a rainy condition to which the specific functions according to the present invention may be applied (S510—YES).

Figure 6:
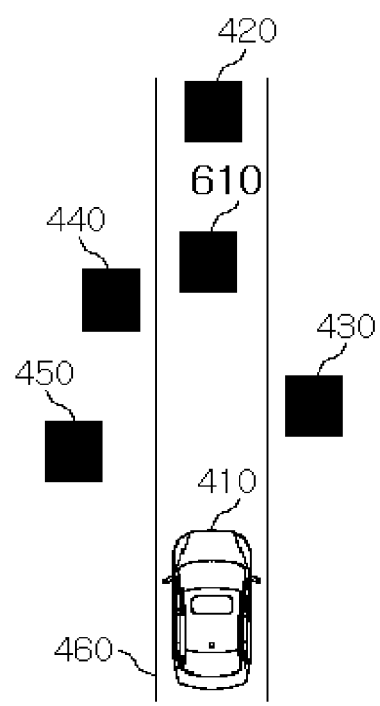
FIG. 6 is a diagram illustrating an example of detecting a new object between a forward vehicle and a self vehicle according to an exemplary embodiment of the present invention.

Here, the vehicle type radar system according to the exemplary embodiment of the present invention may detect that the forward vehicle is present on the self lane and the surrounding vehicles are present on the adjacent lanes by the radar processing unit 330 and may display the objects detected by the track managing process of the tracking processing unit 360 as illustrated in FIG. 6.

The tracking processing unit 340 repeats a process of selecting the control target 420 by a predetermined frequency, for example, three times, to generate the track. For example, the tracking processing unit 340 generates the track based on reflected radar signal received by the radar unit 200 three times every 5 ms and acquires a track detected only by the control target at the first time, detects an object 430 present on a right lane at the second time, and acquires a track detected up to objects 440 and 450 present on a left lane at the third time.

As illustrated in FIG. 6, when the forward vehicle as the control target 420 is present on the self lane (S520—YES), it is determined by the radar processing unit 330 that a distance from the forward vehicle is smaller than a critical distance (S530) and if it is determined that the distance from the forward distance is smaller than the critical distance (S530—YES), it is determined that a new object is detected between the forward vehicle and the self vehicle (S540). FIG. 6 is a diagram illustrating an example of detecting a new object between the forward vehicle and the self vehicle according to the exemplary embodiment of the present invention. In this case, when the distance from the forward vehicle is larger than the critical distance (S530—NO), the process returns to S520 while the tracking operation is continuously performed (S532). In this case, a critical distance from the self vehicle 410 to the control target 420 may be set to be 30 m when the width of the lane is 2 m.

Next, as illustrated in FIG. 6, when a new object 610 between the forward vehicle which is the control target 420 and the self vehicle is detected (S540—YES), it is determined whether the new object 610 is an object which was tracking (S550). Here, the object which is being tracked beforehand keeps on driving on the adjacent lanes means vehicles 430 to 450 which keeps on tracking by the radar unit 200.

However, when the new object 610 detected between the forward vehicle and the self vehicle is not an object which is tracked beforehand (S550—NO), the object is recognized as the non-vehicle like a teleport-in object and thus is excluded by being removed from an object to be tracked (S570).

Figure 7:
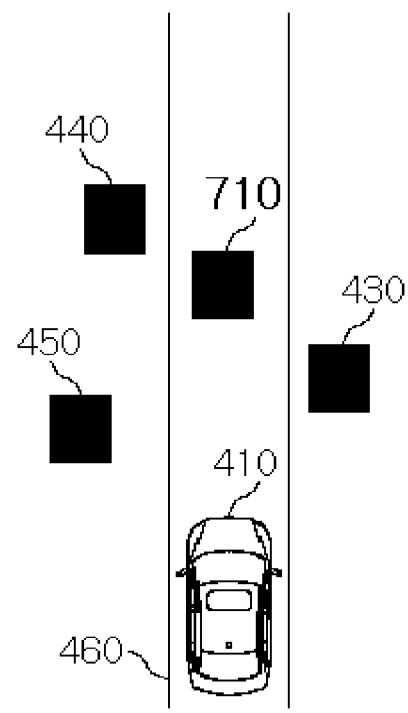
FIG. 7 is a diagram illustrating an example of detecting a new object when no vehicle is present in front of a self lane, according to an exemplary embodiment of the present invention.

Meanwhile, in the state in which the forward vehicle is not present on the self lane (S520—NO), as illustrated in FIG. 7, a new object 710 is abruptly detected in front of the self vehicle and in the case in which the new object 710 is not an object which is tracked beforehand, the new object 710 is not a vehicle which makes a lane change from adjacent lanes and therefore is recognized as a non-vehicle like the teleport-in object, such that the new object 710 is recognized as the non-vehicle to be excluded from the object to be tracked. FIG. 7 is a diagram illustrating an example of detecting a new object when no vehicle is present in front of a self lane, according to an exemplary embodiment of the present invention.

Figure 8:
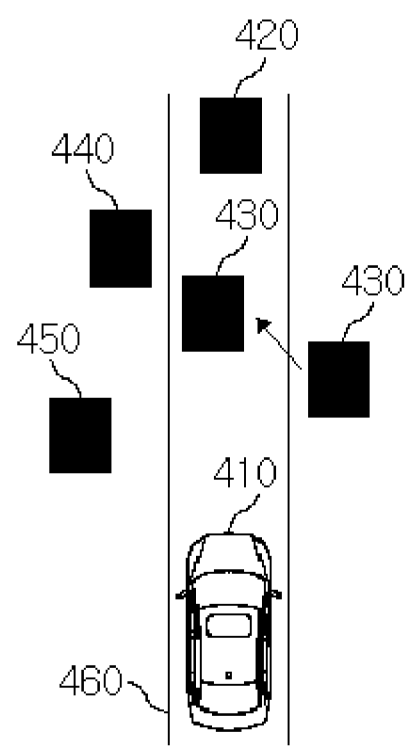
FIG. 8 is a diagram illustrating an example of detecting, as a new object, the object which is being tracked beforehand between the forward vehicle and the self vehicle, according to an exemplary embodiment of the present invention.

However, the new object 610 which is detected between the forward vehicle which is the control target 420 and the self vehicle is an object which is tracked beforehand as illustrated in FIG. 8 (S550—YES), the vehicle control unit 350 controls a vehicle speed and warns the bump accident through the alarm unit 360 (S560). FIG. 8 is a diagram illustrating an example of detecting, as a new object, the object which was tracking between the forward vehicle and the self vehicle, according to an exemplary embodiment of the present invention.

That is, the objects 430 to 450 correspond to the vehicles 430 to 450 which are tracked beforehand by the radar unit 200 while keeping on driving on the adjacent lanes, and therefore the new object 430 detected between the forward vehicle and the self vehicle is recognized as being cut in the self lane by the lane change of the vehicle 430 which is being tracked beforehand, to thereby warn the driver of the bump accident while issuing an alarm to the driver to reduce the vehicle speed.

Meanwhile, the control unit 300 may be expanded horizontally within a predetermined distance based on the current position of the self vehicle 410. That is, the control unit 300 may be expanded between −1.6 m and +1.6 m of a lateral distance based on a self lane width of 2 m.

Further, the control unit 300 may recognize as the uninterested target the new object newly generated within a specific distance which is equal to or less than a maximum of 200 m, for example, 150 m depending on the driving speed of the self vehicle 410 when the control target 420 is not present in front of the self vehicle 410 and then remove the new object.

Further, the control unit 300 may determine whether a new target newly generated at a maximum distance of 200 m or less depending on the driving speed of the self vehicle 410 is selected as the control target according to a separate logic, when the control target 420 is not present in front of the self lane.

As described above, according to the exemplary embodiment of the present invention, it is possible to implement the vehicle type radar system and the method for removing an uninterested target capable of detecting and removing the uninterested targets, such as snow, hailstone, and rain, by the radar while the vehicle having the smart cruise control (SCC) system is driving.

Those skilled in the art will appreciate that since various modifications and alterations may be made without departing from the spirit or essential feature of the present invention, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

According to the exemplary embodiments of the present invention, when the vehicle having the smart cruise control (SCC) system is driving on the day when snow, hailstone, and rain fall, even though the ghost happens due to the radar while the vehicle is driving along the control target in front of the vehicle to be controlled, the ghost is immediately removed by the teleport-in track decision logic, and as a result the jerking operation of the vehicle due to the recognition of the target as the ghost does not happen, thereby preventing the traffic accident, etc., from happening.

The present invention may apply the vehicle type radar system and the method for removing an uninterested target for the vehicle having the smart cruise control (SCC) system to remove the rain ghost using the teleport-in object filtering when the ghost happens on the front window due to rainwater under the bad weather condition that heavy rain falls.

What is claimed is:

1. A vehicle type radar system, comprising:
   a display unit;
   a camera unit configured to photograph a front of a vehicle to detect a lane;
   a radar unit configured to
      transmit a radar signal to the front of the vehicle,
      detect an object based on a reflected radar signal, and
      calculate a position, a speed, and a distance of the detected object based on the reflected radar signal;
   a sensor unit configured to detect weather conditions around the vehicle; and a control unit configured to
  recognize the lane detected by the camera unit,
  generate a track based on the detected object,
  determine whether the detected object is a vehicle or a non-vehicle based on the detected weather conditions and the calculated position and distance of the detected object,
  when the detected object is the non-vehicle object, remove the determined non-vehicle object from track information including the generated track,
  generate and send a control signal to corresponding parts of the vehicle to control a vehicle speed and a vehicle state based on the track information, and
  control the display unit to display the recognized lane and the recognized vehicle object,
wherein, when the weather conditions around the vehicle are a weather condition to which a specific function is applied, when a forward vehicle is present on a driving lane of the vehicle, when a distance from the forward vehicle is smaller than a critical distance, and when a new object is detected on the driving lane, between the forward vehicle and the vehicle, the control unit is configured to
  determine whether the new object is an object which is being tracked beforehand,
  if it is determined that the new object is the object which is being tracked beforehand, recognize the new object as the vehicle object and send a control signal for controlling a speed of the vehicle and an alarm signal to corresponding parts of the vehicle, and
  if it is determined that the new object is not the object which is being tracked beforehand, recognize the new object as the non-vehicle object and remove and exclude the recognized non-vehicle object from the track information.

2. The vehicle type radar system of claim 1, wherein the control unit includes:
  a weather condition recognition unit configured to recognize the weather conditions including rain falls or snow falls, by using the sensor unit;
  a lane recognition unit configured to recognize the driving lane or adjacent lanes, based on data of an image photographed by the camera unit;
  a radar processing unit configured to process a pre-processing process and a post-processing process on the reflected radar signal to detect the object;
  a tracking processing unit configured to
    generate the track based on the detected object,
    manage the generated track to extract track information, and
    select a control target based on the extracted track information;
  a vehicle control unit configured to generate and send a control signal to corresponding parts of the vehicle to control a vehicle speed and a vehicle state, according to the selected control target; and
  an alarm unit configured to alarm when the vehicle approaches the control target within a predetermined distance.

3. The vehicle type radar system of claim 1, wherein, when the weather conditions around the vehicle are a weather condition to which a specific function is applied, when a forward vehicle is not present on a driving lane of the vehicle, and when a new object is detected,
  the control unit is configured to
    determine whether the new object is an object which is being tracked beforehand,
    recognize the new object as the non-vehicle object if it is determined that the new object is not the object which is being tracked beforehand, and
    remove and exclude the recognized non-vehicle object from the track information.

4. The vehicle type radar system of claim 1, wherein, when the weather conditions around the vehicle are a weather condition to which a specific function is applied, when a forward vehicle is not present on a driving lane of the vehicle, and when a new object is detected,
  the control unit is configured to
    determine whether the new object is an object which is being tracked beforehand,
    recognize the new object as the vehicle object if it is determined that the new object is the object which is being tracked beforehand, and
    send a control signal for controlling a speed of the vehicle and an alarm signal to corresponding parts of the vehicle.

5. A method for removing an uninterested target, the method comprising:
  detecting weather conditions around a vehicle;
  photographing a front of the vehicle to detect a lane;
  detecting an object based on a reflected radar signal from a radar signal being transmitted to the front of the vehicle;
  calculating a position, a speed, and a distance of the detected object based on the reflected radar signal;
  generating a track based on the detected object;
  determining whether the detected object is a vehicle or a non-vehicle based on the detected weather conditions and the calculated position and distance of the detected object; and
  controlling corresponding parts of the vehicle to control a vehicle speed and a vehicle state based on track information including the generated track,
  wherein the determining comprises:
    when the detected object is the non-vehicle, recognizing the determined non-vehicle object as the uninterested target; and
    removing the determined non-vehicle object from the track information including the generated track, and
  wherein, when the weather conditions around the vehicle are a weather condition to which a specific function is applied, when a forward vehicle is present on a driving lane of the vehicle, when a distance from the forward vehicle is smaller than a critical distance, and when a new object is detected on the driving lane, between the forward vehicle and the vehicle, the removing comprises:
    determining whether the new object is an object which is being tracked beforehand;
    if it is determined that the new object is not the object which is being tracked beforehand, recognizing the new object as the non-vehicle object and removing and excluding the recognized non-vehicle object from the track information; and
    if it is determined that the new object is the object which is being tracked beforehand, recognizing the new object as the vehicle object and sending a control signal for controlling a speed of the vehicle and an alarm signal to corresponding parts of the vehicle.

6. The method of claim 5, further comprising:
displaying a determined vehicle object, after removing the determined non-vehicle object, and the recognized lane.

7. The method of claim 5, wherein the detecting the object comprises:
processing a pre-processing process and a post-processing process on the reflected radar signal to detect the object;
generating the track based on the detected object;
managing the generated track to extract track information; and
selecting a control target based on the extracted track information.

8. The method of claim 5, wherein, when the weather conditions around the vehicle are a weather condition to which a specific function is applied, when a forward vehicle is not present on a driving lane of the vehicle, and when a new object is detected, the removing comprises:
determining whether the new object is an object which is being tracked beforehand;
recognizing the new object as the non-vehicle object if it is determined that the new object is not the object which is being tracked beforehand; and
removing and excluding the recognized non-vehicle object from the track information.

9. The method of claim 5, wherein, when the weather conditions around the vehicle are a weather condition to which a specific function is applied, when a forward vehicle is not present on a driving lane of the vehicle, and when a new object is detected, the removing comprises:
determining whether the new object is an object which is being tracked beforehand;
recognizing the new object as the vehicle object if it is determined that the new object is the object which is being tracked beforehand; and
sending a control signal for controlling a speed of the vehicle and an alarm signal to corresponding parts of the vehicle.

\* \* \* \* \*